No. 828,637. PATENTED AUG. 14, 1906.
S. D. BLACK.
MOTOR CONTROLLER.
APPLICATION FILED FEB. 5, 1906.

4 SHEETS—SHEET 1.

Witnesses
Geo. A. Byrne.
J. R. Martin.

Inventor
S. D. Black
By John H. Holl
his Attorney

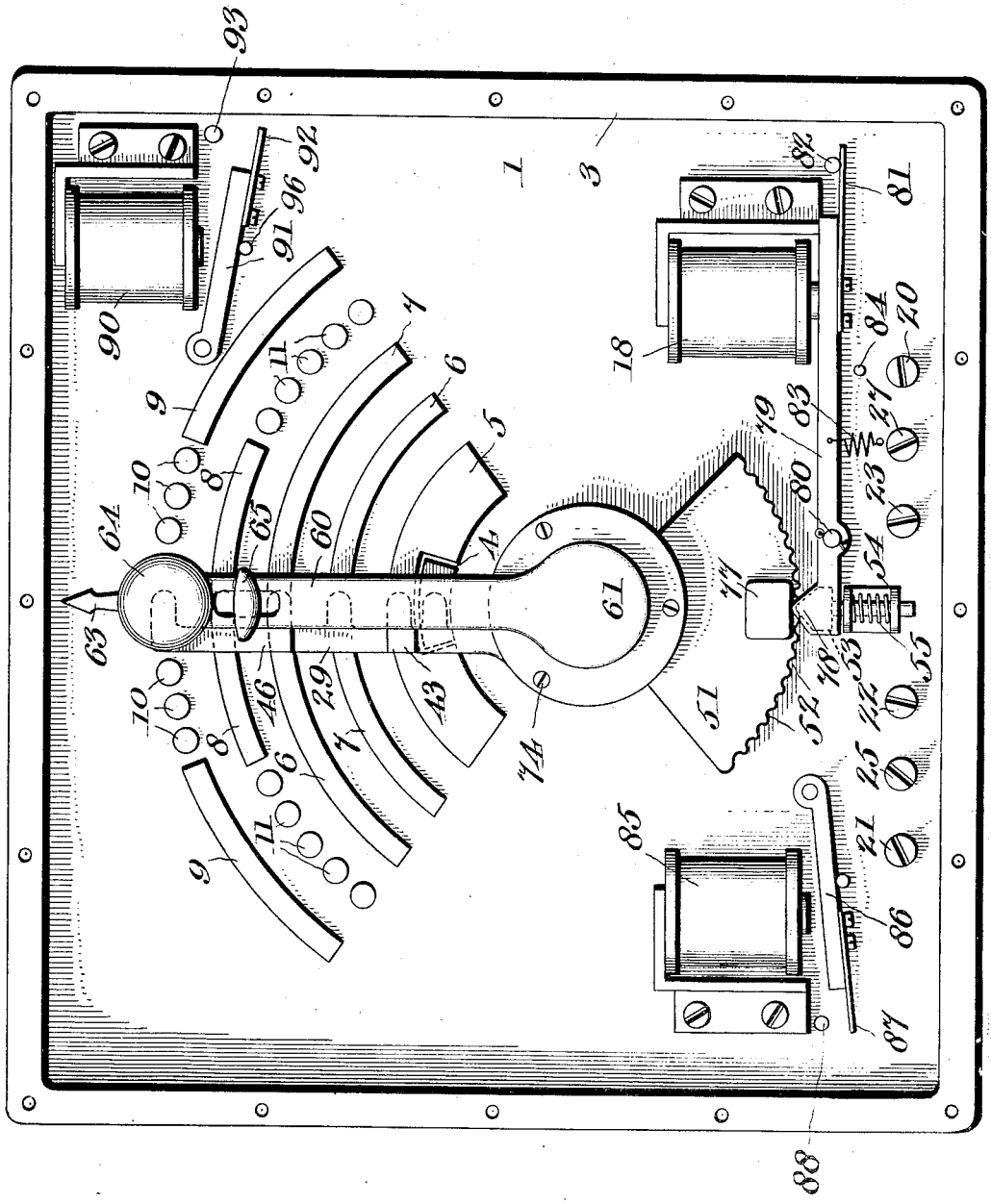

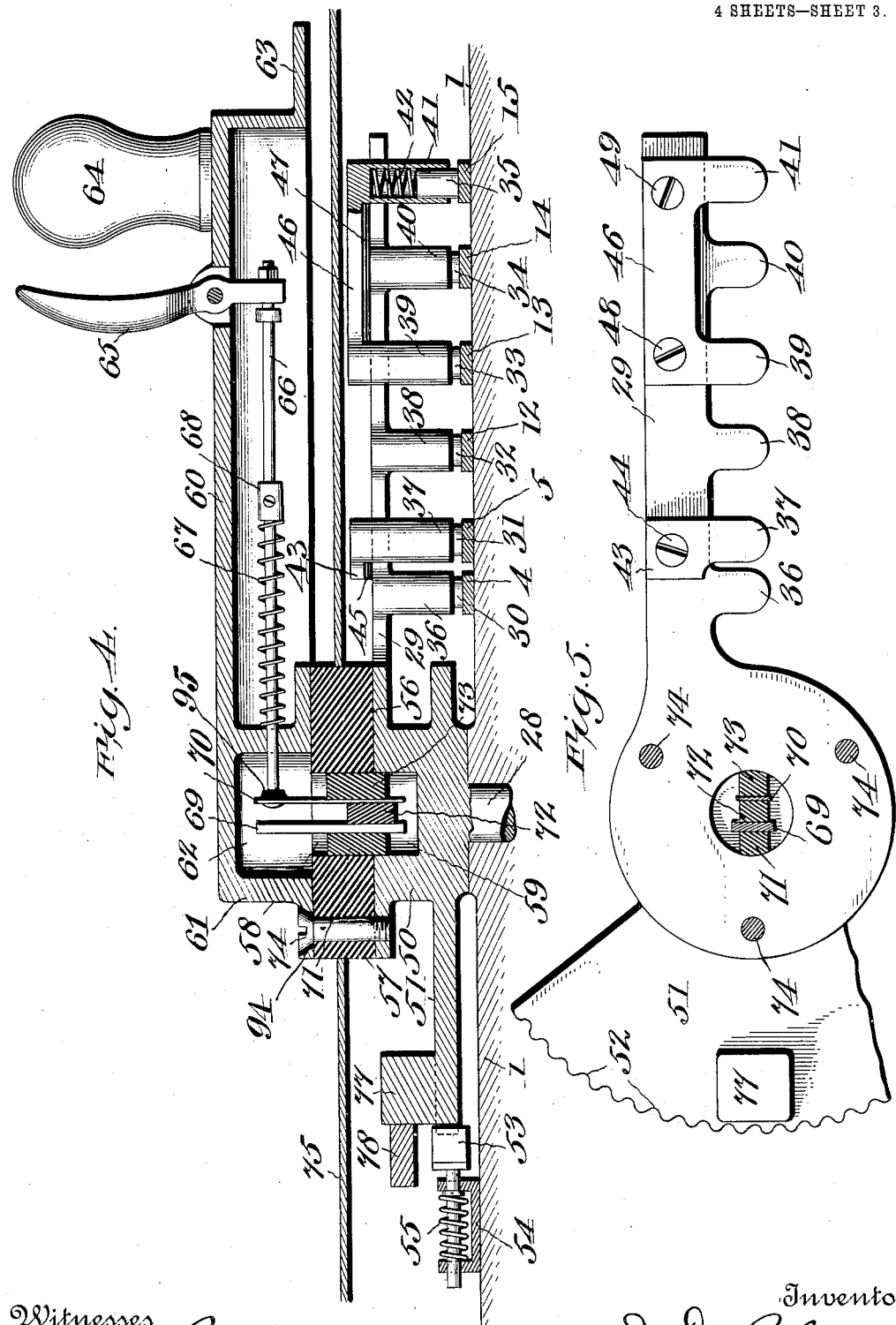

No. 828,637. PATENTED AUG. 14, 1906.
S. D. BLACK.
MOTOR CONTROLLER.
APPLICATION FILED FEB. 5, 1906.

4 SHEETS—SHEET 4.

Witnesses
Geo. A. Bence.
J. R. Martin.

Inventor
S. D. Black
By John K. Hale
his Attorney

UNITED STATES PATENT OFFICE.

SAMUEL DUNCAN BLACK, OF SHERWOOD, BALTIMORE COUNTY, MARYLAND, ASSIGNOR TO MANUFACTURERS' ENGINEERING COMPANY, OF BALTIMORE, MARYLAND, A CORPORATION OF MARYLAND.

MOTOR-CONTROLLER.

No. 828,637. Specification of Letters Patent. Patented Aug. 14, 1906.

Application filed February 5, 1906. Serial No. 299,561.

*To all whom it may concern:*

Be it known that I, SAMUEL DUNCAN BLACK, a citizen of the United States, residing at Sherwood, in the county of Baltimore and State of Maryland, have invented certain new and useful Improvements in Motor-Controllers, of which the following is a specification.

The principal object of this invention is to provide a controller for use with motors, especially in their application to the individual driving of machine-tools and the like, though it may be used in any case where variable-speed motors are used and where it is desired that they shall be easily and quickly controlled.

In the form of my invention herein shown and described the functions of the starting-box and speed-controller are combined with safety devices, such as overload and underload cut-outs, and with an arrangement permitting the quick reversal of the direction of rotation of the motor without injurious sparking at the motor-brushes. These are all controlled in the form of the invention shown by one handle without the use of any auxiliary handles or switches, thus enabling the operator to control the motor and the machine driven by it with one hand, and the whole is so inclosed in a dirt-proof case that it may be placed in any desirable position on the machine without danger from falling dirt or chips.

An additional safety device is provided which prevents the operation of the machine on the starting resistances and which also prevents accidental starting in the event of the controller-handle being struck by some portion of the operator's body or any passing object.

In order to more fully describe my invention, reference will be had to the accompanying drawings, which illustrate an embodiment thereof, and in which—

Figure 1:
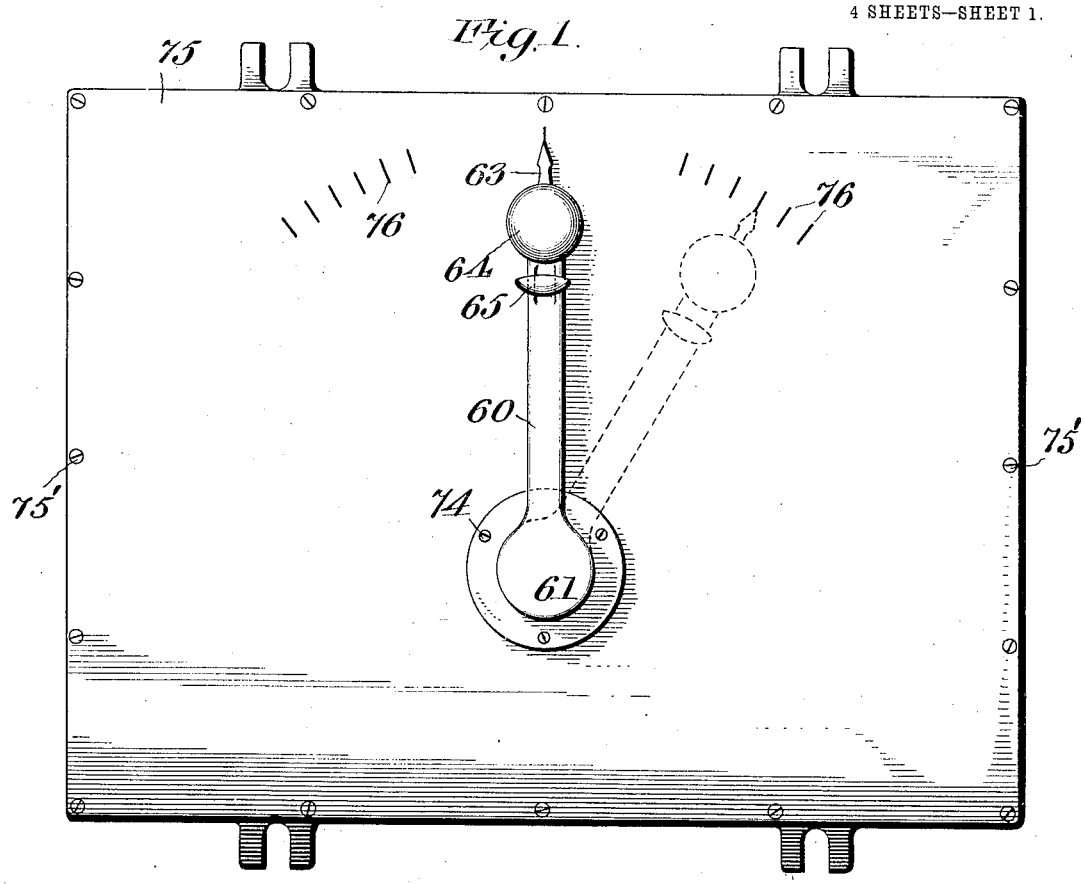
Figure 2:
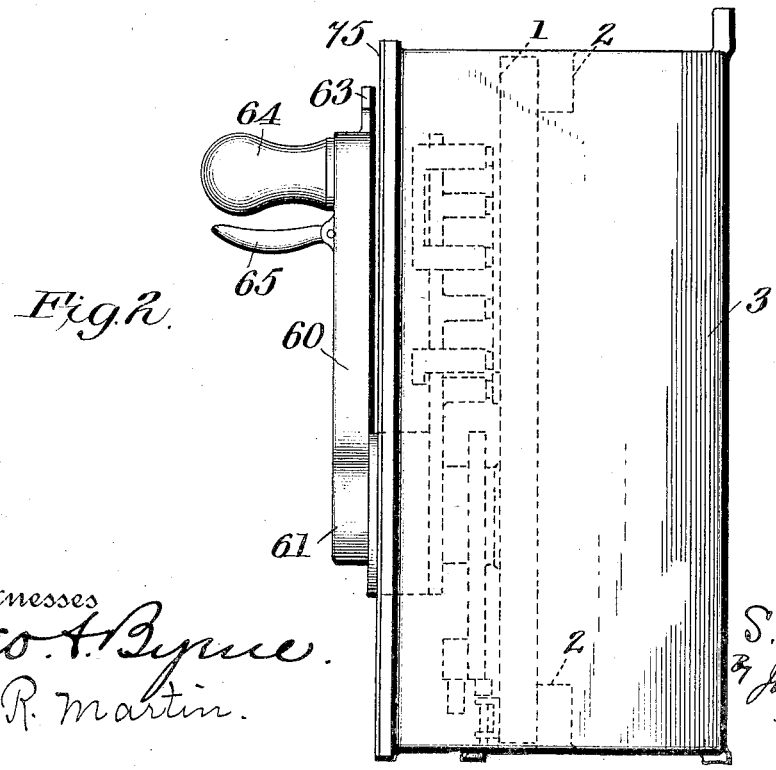
Figure 6:
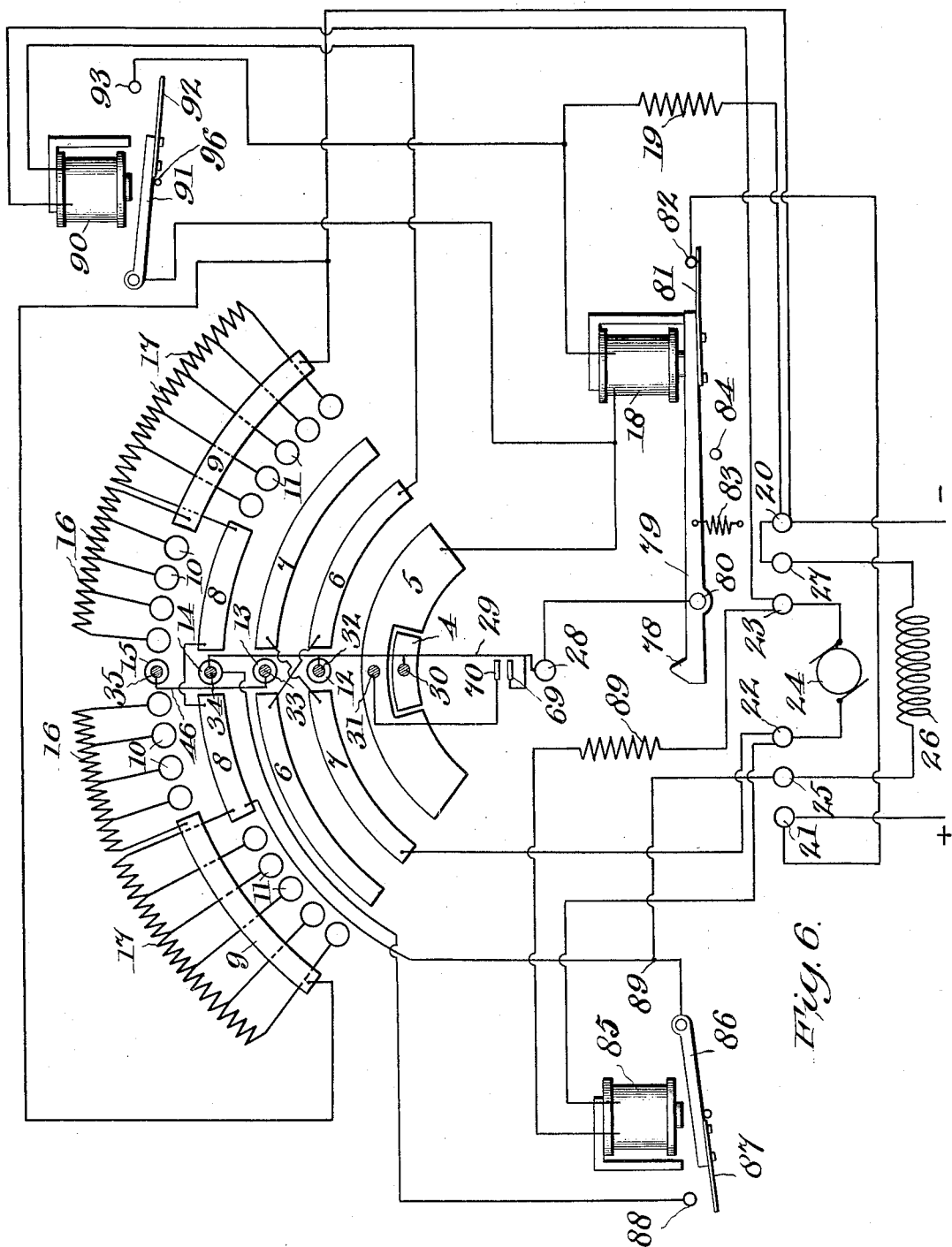

Figure 1 represents the controller in front elevation; Fig. 2, a side elevation of the same; Fig. 3, a top plan view with the cover removed, but with the controller-lever on; Fig. 4, an enlarged fragmentary vertical sectional view, partly in elevation, of the controller-operating lever, switch - arm, and related parts; Fig. 5, an enlarged detail top plan view of the switch-arm, and Fig. 6 a diagram of the electrical connections.

Similar parts are represented by similar numerals throughout the several views.

Referring to the accompanying drawings, 1 represents a slab of slate or other suitable insulating material mounted on supports 2 within a suitable metal or other box or casing 3. (See Fig. 2.)

On the upper face of the slab 1 and made fast thereto are the metallic switch-contact segments 4, 5, 6, 7, 8, and 9, resistance step-contacts 10 and 11, and the "off" contacts 12, 13, 14, and 15. Between successive contacts 10 and the segment 9 are connected motor-starting resistances 16, and between the successive contacts 11 and the segment 8 are connected motor-regulating resistances 17. Segment 5 is electrically connected to one terminal of the winding of the underload cut-out magnet 18, the other terminal of which is electrically connected, through a resistance 19, to the negative-line binding-post 20. The segments 6 and 7 are electrically connected to binding-posts 22 and 23, to which are connected the leads from the motor-armature 24. The segments 8 and 9 are electrically connected, respectively, without passing through resistance 19, to the binding-posts 25 and 20, the former binding-post being for connection to a lead from one side of the motor-field 26. The binding-post 20 is electrically connected to a binding-post 27, to which the other lead from the motor-field is to be connected. The positive side of the line connects to binding-post 21. (See diagram of connections.)

Mounted upon a suitable pivot 28, which may be cast integral therewith, is a movable contact-carrying metal switch-arm 29. The contacts carried by this arm are adapted to engage and travel over the stationary contacts upon the upper face of the slab 1 and may be of any suitable kind. In the accompanying drawings I have shown these as consisting of a plurality of contact-plugs 30, 31, 32, 33, 34, and 35, of carbon or other conducting material. These contacts 30 to 35 are mounted after the fashion of plungers, each in a chamber formed in metal contact-holders 36, 37, 38, 39, 40, and 41 and each pressed forward under the tension of a coil-spring 42.

The contact-holders 36, 38, and 40 are preferably cast integral with the arm 29, though they may be otherwise electrically and mechanically connected thereto. The holder 37 is provided with a flattened lug or projection 43, which is secured to the arm 29 by means of screw 44. The holder 37 is, however, insulated from the arm 29 by means of the insulation 45. The screw 44 is also insulated from the holder 39 by a suitable insulating-bushing in said holder. (Not shown.)

The contact-holders 39 and 41 are cast on a flat metal yoke 46, which rests upon insulation 47 on the arm 29, being secured to said arm by screws 48 and 49, which are insulated from said yoke, as by insulating-bushings therein, not shown. (See Figs. 4 and 5.)

Preferably cast integral with the hub 50 of the contact-carrying arm is a metal segment 51, having upon its periphery a series of notches 52, corresponding to the different operating positions of the contact-carrying arm. Adapted to engage these notches is a catch 53, mounted for longitudinal movement in a suitable bracket 54, made fast to the slab 1. This catch is normally held in engagement with said notches under the tension of a spring 55. The catch 53 tends to hold switch-arm 29 in position and offers resistance to its angular motion, so that when the switch-arm is forced from one position it will move quickly over until the catch engages the next notch, thus making it unlikely that the said switch-arm will be left in an intermediate position or one of the starting positions. This also enables the operator to count the number of notches passed over and so to know the position of the controller-arm without the necessity of removing his eyes from the work in the machine, when changing speed, in order to see the position of the pointer with respect to the indicating-marks hereinafter referred to.

The hub 50 of the arm 29 has an extended flat upper face 56, to which is secured an insulating-disk 57, having an opening 58 through its center, adapted to register with a chamber 59, formed in the said hub. Upon the upper face of this insulating-block 57 is mounted the controller-operating lever 60, consisting in the case shown of a metal arm cast hollow and provided with a flanged hub portion 61, having a chamber 62, and upon the free end of said lever is a pointer 63. This operating-lever is provided with a suitable handle or knob 64, and pivoted near said handle is a grip 65, the lower end of which projects into the interior of the arm 60, where it engages a horizontal rod 66, extending longitudinally of the hollow lever 60 and passing through the hub of said lever into the chamber 62. Mounted upon the rod 66 is a coiled spring 67, held between the hub 61 and a lug 68 on said rod. The object of this spring is to return the rod 66 and grip 65 to their normal positions after operation, as hereinafter more fully described. The object of the grip-and-rod mechanism just described is to operate, by bringing together, two metallic contact-pieces 69 and 70, which are held between insulating-blocks 71 and 72 and 72 and 73, forced into the central opening 58 of the block 57, the contact-strips 69 and 70 extending upward into the chamber 62. The contact-strip 70 is located in line with the rod 66, so that longitudinal movement of the latter toward the said contact-strip will force the same into engagement with the strip 69. The strip 70 carries near its upper end an insulating-block 95, which insulates it from the rod 66. This contact-strip 70 is in electrical connection with the movable contact 31, while the strip 69 is in electrical connection permanently with the switch-arm 29. (See diagram Fig. 6.) The hub 50, disk 57, and hub portion 61 of lever 60 may be held together in any suitable manner, as by screws 74, insulated from the hub portion 61 of the arm 60—as, for example, by bushing 94.

Fitting over the top of the casing 3 of the controller is a removable cover-plate 75, secured to the casing 3, as by means of screws 75', and having an opening adapted to fit snugly around the insulating-disk 57, which latter passes through said opening and extends a short distance on the outside of said plate. This plate, therefore, completely covers all of the operating parts of the controller except the operating-lever 60 and its contained parts, which lever, as will be readily seen from the drawings, is removable by unscrewing the screws 74 without removing the said cover 75. It will, moreover, be readily seen that the cover 75 is removable without having to remove the switch-arm 29. Upon the outer face of the plate 75 are arranged in an arc in front of the pointer 63 a series of marks 76, corresponding to the different operating positions.

On the upper face of the segmental extension 51 of the switch-arm is a lug 77, which in the central or "off" position of the switch-arm is adapted to engage a projection or cam 78 on one end of a lever 79, preferably of magnetic metal, independently pivoted, as at 80, to the slab 1. The other end of this lever 79 forms the armature of the underload cut-out magnet 18 and carries a metal contact-strip 81, adapted to be brought into engagement with the contact-post 82, against the tension of a spring 83 or against gravity, by the engagement of the lug 77 with the cam 78. A stop 84 limits the travel of the lever 79 away from the magnet.

The lever 79 is permanently electrically connected to the contact-carrying arm 29 and the contact-post 82 to the positive-line binding-post 21, (see diagram of connections, Fig. 6,) so that when the switch-lever is in one of the operating positions the circuit-breaking contacts 81 82 will be in the supply-circuit.

When the arm 29 is in its initial or off position, the lug 77, acting on cam 78 of the arm 79, forces the latter into close proximity or engagement with the poles of magnet 18 and the contact-strip into engagement with post 82. In this initial, central, or off position of the arm 29 movable contacts 36, 37, 38, 39, 40, and 41 engage, respectively, the fixed contacts 4, 5, 12, 13, 14, and 15; but no current will flow through the motor or controller, as an attempt to trace the circuit from the positive binding-post 21 will show the contacts 69 and 70 being apart and the brushes 33 and 35 upon the dead contacts 13 and 15. Now, if the grip 65 be pressed toward the handle 64, which will be done when the operator takes hold of said handle to move the lever 60, the rod 66 will send the contact-strip 70 into engagement with contact 69 and current will flow from the positive side of the line through the binding-post 21, contact 82, contact 81, arm 79 to arm 29, contacts 69 and 70, movable contact 31, segment 5, coil of magnet 18, resistance 19 to negative binding-post 20 and thence to line. Current passing thus energizes magnet 18 and causes it to hold contacts 81 and 82 closed, and these contacts will continue to be thus held closed electrically by the magnet 18 under normal conditions as long as the contacts 69 and 70 are forced together by the operation of the grip 65, whether the switch-arm 29 is in its central or off position or moved to its fullest extent or to any position intermediate thereof. In the off position of the switch-arm, however, the contacts 81 82 will be held closed mechanically by the lug 77 acting on the cam 78.

When the switch-arm 29 is moved so that contact 35 rests on the first of the series of contacts 10 which it engages, current flows from the positive side of the line through the underload circuit-breaking contacts 81 82, to the arm 79, pivot 80, pivot 28, switch-arm 29, contact 32, segment 6 on the right, assuming that the switch-arm is thrown to the right, coil of overload-magnet 90, binding-post 23, armature of motor 24, binding-post 22, to segment 7, contact 33, contact 35, to the first of the series of contacts 10, through the resistances 16, to segment 9 and thence to the negative side of the line through the binding-post 20. As the arm 29 is moved along, the successive resistances 16 are cut out, thus admitting current to the armature gradually and avoiding the injurious effects of a sudden inrush of current while the armature is at rest, or nearly so. The positions which the movable contacts occupy in cutting out of the armature-circuit the successive resistances 16 are what shall be designated the "starting" positions of the controller, and are so arranged that the armature resistance is entirely cut off before the first field-regulating position is reached. The last position of the arm when contact 34 is on segment 8, while the contact 35 is on segment 9, and the positions when contact 34 is on the stationary contacts 11 are the positions which will be referred to as the "regulating" positions.

After contact 30 passes the end of segment 4 and engages segment 5 the latter segment will short-circuit contacts 30 and 31 and current will continue to energize magnet 18 even after the grip 65 is released. Segments 4 and 5 are so proportioned that the above short-circuiting will take place after the starting positions are passed over, so that the operator may release the grip and leave the controller-arm in any one of the operating positions; but if he leaves the said arm on a starting position and releases the grip the energizing-circuit of the magnet 18 will be broken at contacts 69 70 and the armature 79, under the action of spring 83 or by gravity, will break the circuit leading from the positive-line binding-post at contacts 81 and 82, thus cutting off the current from the motor. Also if when the switch-arm 29 is in a regulating position—that is, with contact 34 on any of the contacts 11—the current be cut off or the voltage fall, due to some cause outside of the controller, the controller-circuit will at once be broken at the contacts 81 82 by the de-energization of the magnet 18. After the magnet 18 has thus become deënergized its armature cannot be returned and the contacts 81 82 closed until the controller-handle is returned to its initial or off position, in which the lug 77 again comes into engagement with the cam 78, causing the armature 79 to come within attracting distance of the said magnet. This prevents current being led into the motor except gradually through the starting resistances and low-speed positions.

If the controller-handle be accidentally struck or removed from its initial or off position, it is not likely that the grip 65 would be operated for any appreciable time. Hence by such accidental movement of the controller-handle the motor will not be started.

The stationary contacts and segments on the controller-slab are arranged in duplicate on the two sides of the off position, except that the segments 6 and 7, connected between the armature-leads, are interchanged, so that if the controller-handle is moved to the right the motor will run in one direction and if the handle is moved to the left the motor will run in a reverse direction.

In order that the motor may be reversed quickly without injurious sparking at the brushes, it is essential that the flow of current through the field should be uninterrupted, and it is also desirable that whenever the controller-handle is returned to the off position the current should be entirely cut off from the motor without the necessity of pulling out any additional switch, as is the case with all controllers now in commercial use which maintain the field-circuit when reversing. The operator will frequently leave a controller of that kind and forget to disconnect the main or field switch, thus causing waste of current and often damage to property. According to the present invention when the controller-arm is returned to the off position the field-circuit will be maintained for a sufficient length of time to allow the first contact 34 to be moved to the first field-contact on the opposite side. For this purpose I provide the controller with a magnet 85, having a pivoted armature 86, carrying a flexible contact 87, adapted when said armature is energized to engage a stationary contact 88. The coil of this magnet is connected through a suitable resistance 89 between the armature-terminal binding-posts 22 and 23. The contact 88 is connected to controller-contact 14, and the armature 86 is connected to contacts 8, the latter being electrically connected, as shown in diagram of connections, Fig. 6. The motor-field binding-post 25 is electrically connected to a point 89, for example, between the armature 86 and the controller-segment 8. When the switch-arm 29 is returned to its off position and the line-current cut off from the motor-armature, the inertia of said armature and the machine it is driving will cause the armature to revolve for some time before coming to rest after the current is thus cut off. During this time the motor acts as a generator and the current generated in the motor-armature flows back through the magnet 85 and, energizing it, causes it to attract its armature and hold contacts 87 88 closed, thus maintaining the field-circuit until the armature comes to rest and allowing ample time for the controller-handle to be moved over until the field connection is again made by the contacts 34 and 8 in the reverse position. If, however, it is desired to stop the motor, it is only necessary to return the arm 29 to the off position, when, the current from the line being cut off, the motor-armature will come to rest after a few revolutions, and when this takes place the field will be disconnected and there will be no current flowing through any part of the apparatus.

In order to protect the motor against excessive current, I provide an overload-magnet 90, arranged to short-circuit the coils of the magnet 18 when the flow of current becomes excessive. For this purpose I connect the coils of the overload-magnet in series in the armature-circuit of the controller, as between segment 6 and binding-post 23, and provide the magnet 90 with a pivoted armature 91, which carries a flexible contact-strip 92, adapted when the magnet 90 is energized to be brought into engagement with a stationary contact 93. This armature and contact 93 are connected in shunt around the winding of the magnet 18. The magnet 90 will operate only in case of excessive current in the circuit of the motor-armature, and when this occurs it short-circuits the magnet 18, and thereby causes the contacts 81 82 to become deënergized, thus cutting off the motor entirely from the line. By properly adjusting the resistance of the exciting-circuit of the magnet 90 or the position of the stop 96 this magnet may be made to act at any predetermined current strength.

The armatures of both magnets 85 and 90 are represented in the drawings as being arranged to fall away by gravity from the magnets when the latter become deënergized, though obviously these armatures may be supplied with springs—such, for example, as the spring 83—in case the controller is to be worked in a horizontal position.

The function of cutting resistance out of the armature-circuit in starting is not necessary in case of very small motors, and for this reason the starting resistance 16 and the contact-strips therefor may be omitted from controllers designed for use with such motors. In such a case the contacts 10 may be replaced by a continuous segment and the segment 8 may be replaced by a continuation of the contacts 11, between which would be connected a continuation of resistances 17. By this arrangement the field regulation would be started at the first operating position of the arm 29. The contact 37 would also be omitted and the segments 4 and 5 replaced by simple segments and a zero-contact, such as opposite segments 6 7 and contact 12. In such a case the grip 65 and parts operated thereby may also be omitted.

If desired, the overload-magnet and its connections may also be omitted.

Having described a form of my invention, what I claim is—

1. A controller for electric motors, comprising a switch-arm and contacts, an electromagnet, means coöperating with said switch-arm and contacts to connect the coils of said magnet across the motor-supply circuit when the said arm is in an operating position and to disconnect said coils therefrom when said arm is in the "off" position, and circuit-breaker contacts connected in circuit with the coils of said magnet and operative by said magnet to remain normally closed during the operation of the motor.

2. A controller for electric motors, comprising a switch-arm and contacts, an electromagnet, means coöperating with said switch-arm and contacts to connect the coils of said magnet across the motor-supply circuit when the said arm is in an operating position and to disconnect said coils therefrom when said arm is in the "off" position, circuit-breaker contacts connected in circuit with the coils of said magnet and operative by said magnet to remain normally closed during the operation of the motor, and mechanical means coöperating with said switch-arm to retain said circuit-breaker contacts closed when the said arm is in the "off" position.

3. A controller for electric motors, comprising relatively fixed and movable switch-contacts and a switch-arm to coöperate therewith, circuit-breaking contacts for connection in the motor-supply circuit and operative to automatically break said circuit, mechanical means to retain said contacts closed when the switch-arm is in the "off" position, and an electromagnet having its coils connected across said motor-supply circuit independently of the motor-field circuit, said magnet arranged to operate said circuit-breaking contacts to hold the same normally closed during the operation of the motor.

4. A controller for electric motors, comprising relatively fixed and movable switch-contacts and a switch-arm to coöperate therewith, circuit-breaking contacts for connection in the motor-supply circuit and operative to automatically break said circuit, mechanical means to maintain said contacts closed when the switch-arm is in the "off" position, and an electromagnet having its coils connected across said motor-supply circuit and in series with said circuit-breaking contacts, said magnet arranged to coöperate with said circuit-breaking contacts to hold the same normally closed during the operation of the motor.

5. A controller for electric motors, comprising relatively fixed and movable switch-contacts, a switch-arm to coöperate therewith, a circuit-breaker for connection in the motor-supply circuit operative to automatically break said circuit, mechanical means coöperating with said switch-arm to retain the contacts of said circuit-breaker closed when said arm is in the "off" position, and an electromagnet controllable by the voltage in the main supply-circuit independently of that in the motor-field to retain the circuit-breaker contacts normally closed when the said arm is in one of the operating positions, said magnet being non-operative to close said circuit-breaker after the same has automatically broken said armature-circuit until the operation of said mechanical means by the return of said switch-arm to its "off" position.

6. A controller for electric motors, comprising relatively fixed and movable switch-contacts and a switch-arm to coöperate therewith, said arm provided with a cam-operating projection, circuit-breaking contacts for connection in the motor-supply circuit, a pivoted arm arranged to coöperate with said contacts, a cam carried by said arm and adapted to be engaged by said projection on said switch-arm to close said contacts when said switch-arm is in the "off" position, and a magnet controllable by the voltage in the supply-circuit independently of that of the motor-field and operable upon said pivoted arm to hold said contacts normally closed during the operation of the motor.

7. A controller for electric motors, comprising relatively fixed and movable switch-contacts and a switch-arm to coöperate therewith, and provided with a segmental extension having peripheral indentations and a cam-operating projection, a spring-catch adapted to engage said indentations, circuit-breaking contacts for connection in the motor-supply circuit, a pivoted arm arranged to operate said contacts, a cam carried by said arm and adapted to be engaged by said projection on said switch-arm to close said contacts when said switch-arm is in the "off" position, and a magnet having its coils connected to said supply-circuit and operable upon said pivoted arm to hold said contacts normally closed during the operation of the motor.

8. A controller for electric motors, comprising stationary switch-contacts, a pivoted switch-arm carrying contacts adapted to coöperate with said stationary contacts, a hand-operated lever having a hollow hub operatively connected to said switch-arm and mounted on the same pivot therewith, a handle for said lever, a grip pivoted to said lever near said handle, a switch located in the hub of said lever, and operative connection between said switch and said grip.

9. A controller for electric motors, comprising independent starting and speed-regulating resistances, switch-contacts for said resistances, a switch-arm and connections to coöperate with said contacts to cut the starting resistances into and out of the motor-armature circuit and the regulating resistances into and out of the motor-field circuit, a lever for operating said switch-arm, a hand-controlled grip mounted upon said lever, and a switch to control the motor-armature circuit and operative by said grip.

10. A controller for electric motors, comprising independent starting and speed-regulating resistances, switch-contacts for said resistances, a switch-arm and connections to coöperate with said contacts to cut the starting resistances into and out of the motor-armature circuit and the regulating resistances into and out of the motor-field circuit, a lever for operating said switch-arm, a hand-controlled grip mounted upon said lever, a switch to control the motor-armature circuit and operative by said grip, and means to short-circuit said switch when the switch-arm of the controller is in one of the speed-regulating positions.

11. A controller for electric motors, comprising relatively fixed and movable switch-contacts and a switch-arm to coöperate therewith, circuit-breaking contacts for connection in the motor-armature circuit and operative to automatically break said circuit, mechanical means coöperating with said switch-arm to maintain said contacts closed when the switch-arm is in the "off" position, an electromagnet controlled by the voltage in the motor-supply circuit, said magnet arranged to hold said circuit-breaking contacts normally closed during the operation of the motor, a switch in series with the operating-circuit of said magnet, a hand-lever for operating said switch-arm, and hand-operated means carried by said lever to operate said last-mentioned switch.

12. A controller for electric motors, comprising relatively fixed and movable switch-contacts, a switch-arm to coöperate therewith, a circuit-breaker for connection in the motor-supply circuit operative to automatically break said circuit, mechanical means coöperating with said switch-arm to retain the contacts of said circuit-breaker closed when said arm is in the "off" position, an electromagnet to retain the circuit-breaker contacts normally closed when the said arm is in one of the operating positions, and an electrically-operated switch operable by excessive current in the motor-armature circuit to cause said circuit-breaker to break said circuit.

13. A controller for electric motors, comprising relatively fixed and movable switch-contacts, a switch-arm to coöperate therewith, a circuit-breaker for connection in the motor-supply circuit operative to automatically break said circuit, mechanical means coöperating with said switch-arm to retain the contacts of said circuit-breaker closed when said arm is in the "off" position, an electromagnet to retain the circuit-breaker contacts normally closed when the said arm is in one of the operating positions, a magnet having its windings connected in series in the motor-armature circuit, and a switch operated thereby connected in shunt around the windings of the said circuit-breaker-operating magnet.

14. A controller for electric motors, comprising a current-reversing switch for the motor-armature circuit, a hand-operated lever for said switch, an electrically-operated switch operative by current from the motor-armature, and contacts controlled by said hand-operated lever and operative when said lever is in the "off" position to connect the contacts of said electrically-operated switch and the motor-field to the line-terminals, to maintain the current through said fields during the reversal of the motor.

15. A controller for electric motors, comprising a current-reversing switch for the motor-armature circuit adapted to disconnect said armature from the line-terminals in reversing, a hand-operated lever for said switch, an electrically-operated switch operative by current from the motor-armature when running as a dynamo after the line-current is cut off therefrom in reversing, and contacts controlled by said hand-operated lever and operative when said lever is in the "off" position to connect the contacts of said electrically-operated switch and the motor-field to the line-terminals, to maintain the current through said field during the reversal of the motor.

16. A controller for electric motors, comprising a current-reversing switch for the motor-armature circuit adapted to disconnect said armature from the line-terminals in reversing, a hand-operated lever for said switch, an electromagnet having its windings connected to the motor-armature terminals, switch-contacts controlled by said magnet, contacts controlled by said hand-operated lever and operative when said lever is in the "off" position to connect said magnet-controlled contacts and the motor-field to the line-terminals, to maintain the current through said fields during the reversal of the motor.

17. A controller for electric motors, comprising an electromagnetic switch constituting an underload cut-out, a second electromagnetic switch to operate said underload cut-out, motor-regulating resistances, relatively fixed and movable switch-contacts for connecting the magnets of said electromagnetic switches, the motor and said resistances to the source of current-supply, a single switch-arm carrying said movable contacts, a controller-lever to operate said switch-arm, and mechanism operated by said lever to close the switch of said underload cut-out.

18. A starting, current-reversing and speed-regulating controller for electric motors, comprising an underload cut-out, an overload cut-out, means operative to maintain the motor-field current while the motor-armature is cut off from the supply-mains in reversing, but non-operative to maintain the field when the motor is stopped, relatively fixed and movable switch-contacts, and a single controller-operating lever coöperating with said contacts to control all of said parts.

In testimony whereof I affix my signature in presence of two witnesses.

SAMUEL DUNCAN BLACK.

Witnesses:
NANNIE R. BLACK,
MILLARD A. BLACK.